Patented Jan. 29, 1935

1,989,081

UNITED STATES PATENT OFFICE 1,989,081

HALOGENATED HYDROXYDIPHENYL

Walter G. Christiansen, Bloomfield, N. J., and Eugene Moness, Far Rockaway, and Sidney E. Harris, Brooklyn, N. Y., assignors to E. R. Squibb & Sons, New York, N. Y., a corporation of New York No Drawing. Application August 27, 1930, Serial No. 478,288

7 Claims. (Cl. 260—154)

This invention relates to halogenated hydroxydiphenyls, by which term is meant herein hydroxydiphenyl having one or more halogen atoms linked to carbon atoms of the hydroxylated benzene nucleus.

We have found that halogenated hydroxydiphenyls possess extraordinary bactericidal properties; for example, 2-hydroxy 5-bromo diphenyl has a phenol coefficient against Staphylococcus aureus of more than 143 and against Bacterium typhosum of more than 222.

It is the object of this invention to provide halogenated hydroxydiphenyls and a method for the preparation thereof.

A halogenated hydroxydiphenyl is prepared by causing hydroxydiphenyl to react with the free halogen, the reactants preferably being in solution or otherwise diluted. Maintenance during the reaction of low temperatures, say not exceeding 20° C., facilitates the production of the monohalogenated hydroxydiphenyl (especially the 2-hydroxy 5-halogen hydroxydiphenyl) rather than the polyhalogenated hydroxydiphenyl.

As an example, 2-hydroxy 5-bromo diphenyl is prepared by dissolving 85 g. of ortho-hydroxydiphenyl in 100 cc. of carbon disulfide, and, the reaction temperature being lowered to and maintained at about 0° C. by means of an ice-salt freezing mixture, slowly adding with agitation a solution of 80 g. of bromine in 50 cc. of carbon disulfide. Then the carbon disulfide is expelled by evaporation and 2-hydroxy 5-bromo diphenyl separated from the reaction product, which contains also some 2-hydroxy 3-bromo diphenyl and some 2-hydroxy 3,5-dibromo diphenyl, by fractional distillation under reduced pressure, the fraction boiling at between 175° C. and 180° C. under 8 mm. pressure being collected and redistilled at between 158° C. and 160° C. under 4 mm. pressure. The colorless liquid thus obtained, soluble in dilute alkalies and in organic solvents but not in water, is the compound sought.

As a further example, 2-hydroxy 5-chloro diphenyl may be prepared by dissolving 85 g. of ortho-hydroxydiphenyl in 150 cc. of glacial acetic acid, and, while the solution is cooled in an ice-bath and stirred mechanically, the temperature not being permitted to rise above 20° C., conducting chlorine slowly into the solution until there has been sufficient increase in weight to indicate the formation of the monochloro compound. Of the reaction product 77 per cent is 2-hydroxy 5-chloro, and the remainder 2-hydroxy 3,5-dichloro, diphenyl. By fractionation in vacuo the 2-hydroxy 5-chloro diphenyl, a colorless liquid distilling at between 155° and 159° C., is obtained.

It is to be understood that the embodiments hereinbefore described are merely illustrative and by no means limitative of the invention, which may assume various other forms—for instance as to the specific hydroxydiphenyl employed, the particular halogens introduced, the number and positions of the halogen atoms in the hydroxydiphenyl molecule, the solvents used as reaction media, and the specific procedures followed—within the scope of the appended claims.

We claim:

1. Chlorinated hydroxydiphenyl consisting of hydroxydiphenyl having at least one chlorine atom linked to carbon of the hydroxylated benzene nucleus.

2. Monochloro hydroxydiphenyl consisting of hydroxydiphenyl having two chlorine atoms linked to carbon atoms of the hydroxylated benbene nucleus.

3. 2-hydroxy 5-chloro diphenyl.

4. Dichloro hydroxydiphenyl consisting of hydroxydiphenyl having two chlorine atoms linked to carbon atoms of the hydroxylated benzene nucleus.

5. 2-hydroxy 3,5-dichloro diphenyl.

6. In the preparation of 2-hydroxy 5-chloro diphenyl, the step of causing ortho-hydroxydiphenyl to react with free chlorine.

7. In the preparation of 2-hydroxy 5-chloro diphenyl, the step of causing ortho-hydroxydiphenyl to react with free chlorine at a temperature not exceeding 20° C.

WALTER G. CHRISTIANSEN.
E. MONESS.
S. E. HARRIS.